United States Patent [19]

Carter et al.

[11] Patent Number: 5,780,139
[45] Date of Patent: Jul. 14, 1998

[54] MULTI-LAYER ANVIL FOR ULTRA HIGH PRESSURE PRESSES

[75] Inventors: Lan Carter, Payson; Madapusi K. Keshavan; Ghanshyam Rai, both of Sandy, all of Utah; Jimmy W. Eason; Vonnie D. Hood, both of Rogers, Ark.

[73] Assignee: Rogers Tool Works, Inc., Rogers, Ark.

[21] Appl. No.: 715,437

[22] Filed: Sep. 18, 1996

[51] Int. Cl.$^6$ ................................................ B21D 37/04
[52] U.S. Cl. ........................ 428/217; 72/481.1; 73/128; 73/131; 428/457; 428/469; 428/698; 428/325
[58] Field of Search .................. 51/307, 309; 428/212, 428/472, 469, 698, 325, 457; 76/DIG. 11; 72/481.1; 73/128, 131

[56] References Cited

U.S. PATENT DOCUMENTS 2,888,247  5/1959  Haglund .
3,909,895  10/1975  Abrahamson et al. .
4,350,528  9/1982  Engle ........................................ 75/203
4,359,335  11/1982  Garner ...................................... 428/698
4,505,721  3/1985  Almond et al. ........................... 51/309
4,705,124  11/1987  Abrahamson et al. ............. 76/DIG. 11

*Primary Examiner*—Archene Turner
*Attorney, Agent, or Firm*—Christie, Parker & Hale, LLP

[57] ABSTRACT

An anvil for use in ultra high pressure presses capable of operating in the pressure ranges where diamonds, polycrystalline diamond composites and cubic boron nitride are stable, fabricated by diffusion bonding together a plurality of cemented tungsten carbide layers. The anvil has a working layer adjacent to the highest pressure of the press with the remaining plurality of layers behind the working layer for support. The working layer has a higher hardness than the supporting layers and the supporting layers each have higher toughness than the working layer.

19 Claims, 2 Drawing Sheets

MULTI-LAYER ANVIL FOR ULTRA HIGH PRESSURE PRESSES

BACKGROUND

The present invention relates to anvils for ultra high pressure presses. In particular it relates to anvils fabricated from multiple layers of cemented tungsten carbide which are diffusion bonded together.

Anvils incorporated in ultra high pressure presses, such as cubic presses, which are used in producing diamonds, polycrystalline diamond composites, and cubic boron nitride generate pressures greater than 30 kilobars and are adjacent to temperatures in excess of 1500° C. Currently, such anvils are fabricated as single pieces from a single grade of cemented tungsten carbide which is sometimes modified in carbon balance. A typical anvil used in a cubic press is approximately 18 cm long with a base diameter of approximately 18 cm. Due to its relatively voluminous size, the temperature during sintering and during dewaxing cannot be maintained constant at the proper levels throughout the anvil's volume. This results in non-uniform sintering and dewaxing. Furthermore, the pressure applied to the anvil during the hot isostatic pressing phase of its manufacturing process cannot be maintained constant at the required levels, throughout the anvil's volume, for eliminating any voids or air bubbles that may be trapped in the anvil volume.

These non-uniformities may result in "weak" areas throughout the anvil. For example, areas which are not sintered at the proper temperature, or which are not completely dewaxed, or which contain voids or air bubbles will have a relatively lower strength than the remainder of the anvil. Furthermore, voids and air bubbles create stress concentrations at their perimeters. As a consequence, cracks tend to initiate prematurely at these "weak" areas. The degree of these non-uniformities varies from anvil to anvil. As a result, the lives of single-piece anvils fabricated from a single grade of cemented tungsten carbide can differ significantly. It is not uncommon for one anvil from a manufacturing lot to fail at about 500 cycles, while another from the same lot to fail at 15,000 cycles. Average life for a manufacturing lot for cubic press anvils has ranged from less than 1000 cycles to over 10,000 cycles. This disparity in the fatigue lives between anvils causes anvil users to always purchase and store a supply of anvils in case of premature failures.

Anvils used in ultra high pressure presses require a high hardness pressure at the applying surface. As the hardness of the surface increases, the uniformity of the pressure applied by the surface also increases. The level of hardness of the cemented tungsten carbide used in fabricating single-piece anvils, however, is limited. High hardness cemented tungsten carbide material has low fracture toughness and will crack under the peak stresses being subjected upon the anvil during operations. As a consequence, single grade cemented tungsten carbide anvils cannot be fabricated from a very high hardness cemented tungsten carbide.

An ultra high pressure press anvil with increased crack resistance characteristics and increased consistent life is desirable to reduce the costs associated with the frequent replacement of anvils and the purchase and storage of multiple back-up anvils. Furthermore, an anvil that can take advantage of the high hardness capabilities of cemented tungsten carbide will be better capable of providing uniform ultra high pressures in the press.

SUMMARY OF THE INVENTION

The present invention comprises an anvil for use in a ultra high pressure press capable of operating in the pressure ranges where diamonds, polycrystalline diamond composites and cubic boron nitride are stable. The anvil is fabricated from multiple layers of differing cemented tungsten carbide grades and differing thicknesses diffusion bonded together. Preferably, a working layer adjacent to the highest pressure of a press has a higher hardness than a supporting layer behind it and the supporting layer has higher toughness than the working layer.

The anvil is tailored using the various layers to have a high hardness working or tip layer for applying uniform ultra high pressures, increased crack growth resistance, and enhanced fatigue life. To prevent cracking of the brittle high hardness working layer, the working layer is not exposed to the anvil maximum stresses. Typically, peak shear stresses occur at a small distance below the pressure applying surface of the working layer. The working layer thickness is selected to be smaller than this distance for ensuring that the peak shear stresses occur on a subsequent layer. Furthermore, a relatively soft layer is incorporated in the anvil to arrest crack growth that can lead to anvil failures.

Relatively thin layers can be uniformly sintered, dewaxed, and hot isostatically pressed. This uniformity is achieved because the temperature and pressure can be maintained at the required levels throughout the volume of the relatively thin layers during fabrication. As a result, thin layers are less susceptible to voids, air bubbles and other "weak" spots caused by non-uniform sintering, dewaxing and hot isostatic pressing. Therefore, anvils fabricated from thin layers, diffusion bonded together, have increased resistance to crack growth and an enhanced fatigue life. In addition, the consistency in the fatigue lives between anvils fabricated to the same specification, is increased due to the decrease of "weak" spots within the anvils.

DETAILED DESCRIPTION

Figure 1:
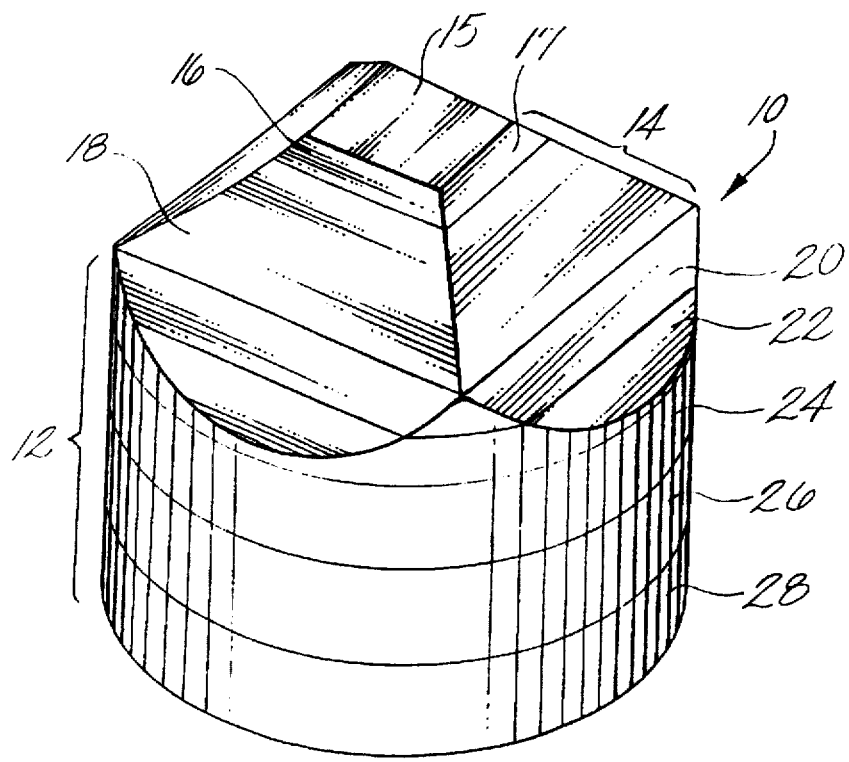
FIG. 1 is an isometric view of a multi-layered cubic press anvil.

In FIG. 1 a cubic press anvil 10 comprising seven layers differing in hardness and toughness is depicted. The anvil described by this invention can be used on any ultra high pressure press operating in the pressure ranges where diamonds, polycrystalline diamond composites and cubic boron nitride are stable. An anvil for use with a cubic press is used to describe the present invention herein by way of example.

A cubic press is one form of high pressure-high temperature press used for making diamond or cubic boron nitride or processing such materials into polycrystalline composites. Such presses are well described in patents and literature and are in use by several makers of diamonds. In such a press, six orthogonally arranged anvils are synchronously moved toward each other by hydraulic actuators. The converging anvils apply increasing pressure on materials within the cubic volume defined by the anvil faces. The gaps between the edges of anvils are sealed by high pressure gasket material such as pyrophyllite. Pressure is applied to the square end face of the anvil and to the diverging side faces by the gasket material.

Each anvil is fabricated from multiple cemented tungsten carbide layers diffusion bonded together in accordance with Engle, U.S. Pat. No. 4,350,528, the subject matter of which is hereby incorporated by reference. The anvil comprises a base section 12 and a tip section 14. The base section is comprised of circular layers. The tip section is pyramidal and is comprised of truncated pyramidal layers. One or more intermediate layers may be partly pyramidal and partly cylindrical.

The first or working layer 16 is in the form of a truncated pyramid and has the highest hardness and lowest toughness relative to all other layers. The working layer has a square end or working face 15 which faces into the high pressure cavity of the press. Four lateral faces 17 slope away from the edges of the end face at 45°. The gasket material squeezes out into the gaps between the lateral faces as pressure is applied by the anvils. The working layer is the layer that directly applies pressure to the diamond forming material being pressed by the press. The high hardness is required to ensure that an uniform ultra high pressure can be applied to the diamond forming material being pressed.

To achieve a high hardness, the layer is preferably fabricated from cemented tungsten carbide with a cobalt content of 8% or less and an average tungsten carbide grain size of less than 1 micron. The high hardness makes the working layer brittle and more susceptible to cracking than softer layers. To decrease the potential for cracking, the thickness of the working layer is chosen such that the maximum shear stresses on the anvil occur at a location below the working layer. For the particular anvil shown in the drawing, the maximum shear stress of approximately 50 to $60 \times 10^3$ $kg/cm^2$ occurs at a location approximately ½ cm below the working layer pressure applying surface 15 and extends for approximately 2 cm. The working layer, therefore, is chosen to have a thickness less than a ½ cm so that it is not exposed to this maximum shear stress.

The second layer 18, which is diffusion bonded to the working layer, has a lower hardness than the working layer, with increased toughness for increased crack growth resistance. To achieve this, cemented tungsten carbide with a cobalt content of approximately 10% and an average tungsten carbide grain size of less than 1 micron is used. In the particular anvil depicted in the drawing, the thickness of this layer is chosen at 3.2 cm to ensure that the maximum shear stress is confined within its thickness. The layer material properties are selected so that the layer can withstand the high stress levels without subjecting the anvil to a substantial decrease in fatigue life.

The third layer 20, which is diffusion bonded to the second layer, also has a truncated pyramidal geometry. This layer is the softest layer used. In this particular anvil, it is thinner than the other layers, with the exception of the working layer. This layer is about half the thickness of the second layer. This thinner, "soft," cemented tungsten carbide layer provides a medium in the anvil for arresting any crack growth initiated at the "harder" layers so that the crack does not cause catastrophic failure. A grade of cemented tungsten carbide that contains 10% cobalt and has a mean tungsten carbide grain size of 2–3 microns is used for this layer.

The fourth layer 22 serves as the interface between the pyramidal and cylindrical sections. Its upper section is tetrahedral in geometry, while its lower section is cylindrical. In this particular anvil, this layer is also approximately half the thickness of the second layer and is also typically fabricated from the same grade of tungsten carbide as the second layer.

The remaining layers, fifth 24, sixth 26 and seventh 28, have a cylindrical geometry and are fabricated from the same grade of cemented tungsten carbide as the second layer. In addition, they all have approximately the same thickness as the second layer.

As discussed earlier, the anvil described herein, is by way of example. The present invention is not limited only to this type of anvil. Each layer geometry, thickness and tungsten carbide grade can be selected to tailor an anvil for a proposed application ensuring increased crack growth resistance and enhanced fatigue life.

The individual layers of cemented tungsten carbide are made by conventional techniques. As used herein, cemented tungsten carbide, or sometimes simply tungsten carbide or carbide, includes equivalent materials which may include titanium carbide, tantalum carbide, or the like. Although cobalt is the most typical binder, other binder metals may also be used.

A cemented tungsten carbide layer is made by blending tungsten carbide particles, typically nearly stoichiometric WC, with cobalt powder. These materials are mixed in a ball mill or attritor mill with a temporary binder. Exemplary binders include polyvinyl alcohol or a paraffin wax in a hexane solvent. The temporary binder holds the particles together during initial processing. The initial mixture of carbide, cobalt and binder may be rolled into tiny pellets for ease of handling.

Such a mixture is used to fill a mold having substantially the net shape of the layer to be formed. The mold is oversized to allow for shrinkage of the mixture during sintering. The mixture is pressed in the mold at pressures of 2000 $kg/cm^2$ or more for forming a "green" compact in which the particles are held together temporary binder. By making the anvils in a plurality of thin layers, the pressing of the individual layers can be more reliable and produce higher uniformity.

The green compacts are placed on graphite trays and loaded into a vacuum furnace. The compacts are heated to a sufficient temperature for vaporizing the temporary binder. The furnace may then be back filled with hydrogen or a reducing mixture of gas for the balance of the sintering process. The temperature is then raised to near the melting point of cobalt. This causes consolidation of the compact into cemented tungsten carbide at nearly 100% of theoretical density. In other words, very little void space remains in the cemented tungsten carbide.

To further increase the density and minimize the presence of voids in the cemented tungsten carbide. It is desirable to subject the individual layers to hot isostatic pressing, or "HIPing." HIPing involves reheating the sintered compact to temperatures somewhat lower than the melting point of cobalt in a high pressure vessel. The isostatic pressure on the high-temperature compact further condenses and homogenizes the layer.

To complete the anvil made from such layers, the mating faces of the layers are carefully ground to fit tightly together. The stack of layers forming the anvil is then pressurized and heated as described in U.S. Pat. No. 4,350,528 for diffusion bonding the layers together and forming the integral anvil.

During fabrication of the thin layers, the temperature and pressure can be maintained constant, at the required levels, throughout the thin layer volume, allowing for uniform sintering, dewaxing and hot isostatic pressing. Consequently, the layers are less susceptible to the formation of "weak" spots due to sintering at lower than required temperatures or due to incomplete dewaxing. Furthermore, the constant pressure over the volume of the layer during initial pressing and hot isostatic pressing allows for the removal of voids and/or air bubbles that may be present in the layer. As a result, multi-layered anvils as described herein have higher fatigue lives since thin layers inherently are less susceptible to premature cracking due to their decreased susceptibility to "weak" spots. In addition, the consistency of the fatigue lives of anvils fabricated to the same specification increases due to the decrease of "weak" spots within each anvil.

In addition, the capability of tailoring the anvil by use of the cemented tungsten carbide layers of different grades allows for the incorporation of a very high hardness layer at the working face of the anvil. This gives the anvil the capability of applying uniform ultra high pressure. At the same, by making the working layer thin, it can be ensured that the working layer will not be exposed to maximum shear stresses that can cause it to crack. Use of layers allows one to incorporate an intermediate "soft" layer to serve as a crack arresting medium preventing any cracks from traversing the anvil body and becoming catastrophic. In other words, tailoring the anvil using the different grades and thicknesses of layers allows for fabrication of a better performing anvil capable of withstanding its operating environment for consistently longer periods than single-piece, single-grade, anvils.

Figure 2:
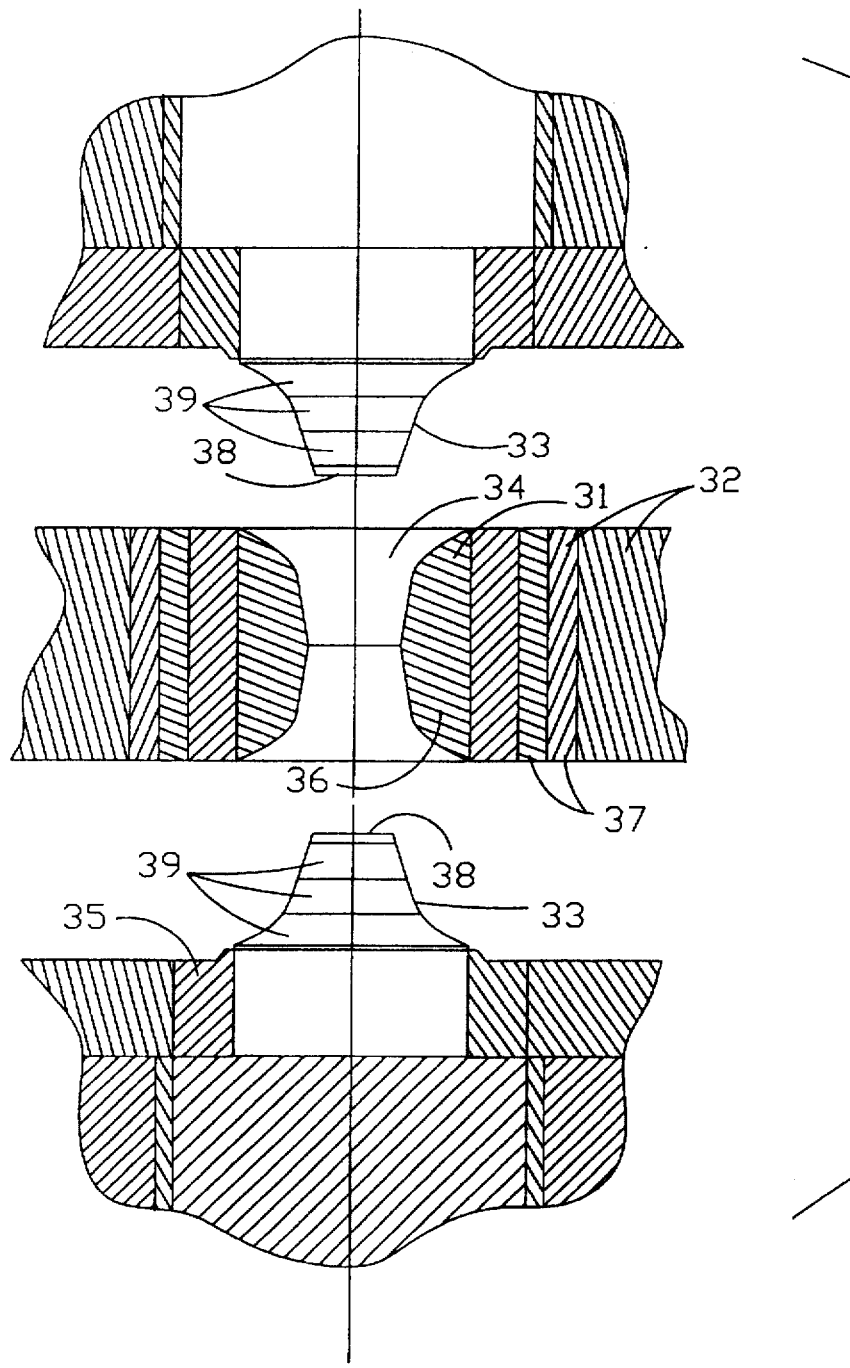
FIG. 2 is a longitudinal cross section through a belt and pair of anvils for a belt press.

Another type of press commonly used in the diamond industry is known as a belt press (FIG. 2). A belt press has an annular "belt" or ring typically having a central annular body 31 of cemented tungsten carbide surrounded by an annular body 32 of high strength steel shrunk onto the carbide ring. A pair of approximately conical cemented tungsten carbide anvils 33 move axially into tapered holes 34 in the belt for creating a high pressure within the belt between the anvils. The carbide anvils are surrounded by steel rings 35. Again, the gaps between the anvils and belt are sealed with pyrophyllite or the like.

The techniques described herein may be used for fabricating the cemented tungsten carbide belt and anvils for a belt press. In such an embodiment, the annular working layer 36 of the belt which encounters high pressure is formed of hard material with less toughness. The supporting layers 37 of the belt are formed of somewhat softer, tougher cemented tungsten carbide. For purposes of this method, belts are equivalent to anvils and may be made with multiple layers of the same or differing grades of carbide.

Each anvil has a working layer 38 at the tip that enters the hole in the center of the belt for applying high pressure. Supporting layers 39 behind the working layer are truncated cones and are of a softer, tougher material than the working layer.

It will also be recognized that anvils and belts may be made in layers which are separately pressed and sintered and then diffusion bonded together, wherein the layers have similar compositions in all layers. Even without varying the compositions in the several layers this technique is advantageous because of the ability to make thick anvils with greater uniformity than available in anvils made in a single large piece.

What is claimed is:

1. An anvil comprising a plurality of cemented tungsten carbide layers diffusion bonded together for applying pressure in an ultra high pressure press capable of operating in the pressure ranges where diamonds, polycrystalline diamond composites and cubic boron nitride are stable.

2. An anvil as recited in claim 1 comprising a working layer adjacent to the highest pressure of a press and at least one supporting layer behind the working layer, wherein the working layer has a higher hardness than the supporting layer and the supporting layer has higher toughness than the working layer.

3. An anvil as recited in claim 1 comprising a working layer adjacent to the highest pressure of a press and a plurality of supporting layers behind the working layer, wherein the working layer has a higher hardness than the supporting layers and the supporting layers each have higher toughness than the working layer.

4. An anvil as recited in claim 1 comprising a working layer adjacent to the highest pressure of a press and at least three supporting layers behind the working layer, wherein the working layer has a higher hardness than the supporting layers and comprising a first supporting layers adjacent to the working layer having higher toughness than the working layer, a second supporting layer adjacent to the first supporting layer having greater resistance to crack propagation than the first supporting layer and a third supporting layer adjacent to the second supporting layer having hardness greater than the second supporting layer.

5. An anvil as recited in claim 1 comprising a working layer adjacent to the highest pressure of a press and a plurality of supporting layers behind the working layer, wherein the working layer has the greatest hardness, wherein an intermediate supporting layer has a lower hardness, and wherein all other supporting layers have a hardness greater than the hardness of the intermediate supporting layer but lower than the hardness of the working layer.

6. An anvil as recited in claim 5 wherein a peak shear stress occurs at an axial location below the working layer.

7. An anvil as recited in claim 1 comprising an annular belt having an annular ring of cemented tungsten carbide formed of a plurality of annular layers, a working layer nearer the center of the ring having a higher hardness than a supporting layer further from the center of the ring, and the supporting layer having a higher toughness than the working layer.

8. An anvil as recited in claim 1 comprising a base section and a working section, wherein the base section is cylindrical and the working section is a truncated cone with truncated conical layers.

9. An anvil having a tip section adjacent to a base section, used in a ultra high cubic press for making diamonds, polycrystalline diamond composites and cubic boron nitride, wherein the tip section comprises a working layer adjacent to the highest pressure of the press and a plurality of supporting layers behind the working layer said layers being truncated pyramidal cemented tungsten carbide layers diffusion bonded together, wherein the base section comprises a plurality of cylindrical cemented tungsten carbide layers, wherein the working layer has the highest hardness relative to all other layers, and wherein a layer located between the working layer and the base section has the lowest hardness but highest toughness.

10. An anvil as recited in claim 9 wherein the working layer and the lowest hardness layer are separated by another layer with a hardness greater than that of the lowest hardness layer but lower than that of the working layer.

11. An anvil as recited in claim 9 wherein the working layer has a cobalt content of 8% or less and a mean tungsten carbide grain size of less than 1 micron.

12. An anvil as recited in claim 9 wherein:
the working layer has a thickness of approximately less than ½ cm, a mean tungsten carbide grain size of less than 1 micron, and a cobalt content of 8% and comprising;
a second layer adjacent to the working layer, having a thickness of approximately 3.2 cm, a mean tungsten carbide grain size of less than 1 micron, and a cobalt content of 10%;

a third layer adjacent to the second layer having a thickness equal to approximately half the thickness of the second layer, a mean tungsten carbide grain size greater than that of the second layer and a cobalt content approximately equal to that of the second layer;

a fourth layer adjacent to the third layer having a thickness approximately equal to the thickness of third layer and a mean tungsten carbide grain size and cobalt content approximately equal to the tungsten carbide grain size and cobalt content of the second layer;

a fifth layer adjacent to the fourth layer having a thickness, mean tungsten carbide grain size and cobalt content approximately equal to the thickness, mean tungsten carbide grain size and cobalt content of the second layer;

a sixth layer adjacent to the fifth layer having a thickness, mean tungsten carbide grain size and cobalt content approximately equal to the thickness, mean tungsten carbide grain size and cobalt content of the second layer; and a seventh layer adjacent to the sixth layer having a thickness, mean tungsten carbide grain size and cobalt content approximately equal to the thickness, mean tungsten carbide grain size and cobalt content of the second layer.

13. An anvil as recited in claim 9 wherein the third layer has a mean tungsten carbide grain size in the range of between approximately 2 and 3 microns.

14. An anvil comprising a working layer with a plurality of cemented tungsten carbide supporting layers wherein the working layer has the greatest hardness of all the layers, wherein an intermediate supporting layer has the lowest hardness to arrest any cracks initiated at the working layer, and wherein all other supporting layers have a hardness greater than the hardness of the intermediate supporting layer but lower than the hardness of the working layer, wherein the anvil is used in a press for making diamonds, polycrystalline diamond composites and cubic boron nitride.

15. An anvil as recited in claim 14 wherein a layer separates the working layer from the intermediate layer.

16. An anvil as recited in claim 14 comprising a base section and a working section, wherein the base section is cylindrical with circular layers and the working section is a truncated pyramid with truncated pyramidal layers.

17. An anvil as recited in claim 16 comprising:

a first truncated pyramidal tungsten carbide layer, forming the tip of the anvil, having a cobalt content lower than 8% and a mean grain size of less than one micron;

a second truncated pyramidal tungsten carbide layer, diffusion bonded adjacent to the first layer, having a cobalt content greater than first layer and a mean grain size of less than one micron;

a third truncated pyramidal tungsten carbide layer, diffusion bonded to the second layer to arrest any crack growth initiated at the first or second layers, having a cobalt content equal or greater than that of the second layer and a mean grain size greater than that of the first layer;

a fourth truncated pyramidal tungsten carbide layer, diffusion bonded adjacent to the third layer, having a cobalt content greater than first layer and a mean grain size of less than one micron;

a fifth circular tungsten carbide layer, diffusion bonded adjacent to the fourth layer, having a cobalt content and a mean grain size approximately equal to the fourth layer;

a sixth circular tungsten carbide layer, diffusion bonded adjacent to the fifth layer, having a cobalt content and a mean grain size approximately equal to the fifth layer; and a seventh circular tungsten carbide layer, diffusion bonded adjacent to the sixth layer, having a cobalt content and a mean grain size approximately equal to the sixth layer.

18. An anvil as recited in claim 14 wherein the crack arresting third layer has a thickness equal to approximately half the thickness of the second layer.

19. An anvil as recited in claim 14 comprising a base section and a working section, wherein the base section is cylindrical with circular layers and the working section is a truncated cone with truncated conical layers.

* * * * *